United States Patent
Cooper

(10) Patent No.: US 6,711,526 B2
(45) Date of Patent: Mar. 23, 2004

(54) OPERATING SYSTEM-INDEPENDENT METHOD AND SYSTEM OF DETERMINING CPU UTILIZATION

(75) Inventor: Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/750,676

(22) Filed: Dec. 29, 2000

(65) Prior Publication Data

US 2002/0087291 A1 Jul. 4, 2002

(51) Int. Cl.$^7$ ................................................. H04B 1/38
(52) U.S. Cl. ........................ 702/186; 702/89; 702/176; 702/178; 702/182; 702/185; 702/187
(58) Field of Search ................... 712/89, 176, 178, 712/182–187; 702/FOR 103–104, FOR 134–135, FOR 154–157, FOR 170–171; 713/502, 323, 320, 178, 500, 300; 714/38; 709/102, 105, 100, 101, 103, 107

(56) References Cited

U.S. PATENT DOCUMENTS

| | | | |
|---|---|---|---|
| 4,438,490 A | | 3/1984 | Wilder et al. |
| 4,485,440 A | | 11/1984 | Duff et al. |
| 5,072,376 A | | 12/1991 | Ellsworth |
| 5,475,844 A | * | 12/1995 | Shiramizu et al. .......... 709/104 |
| 5,564,015 A | | 10/1996 | Bunnell |
| 5,623,647 A | | 4/1997 | Maitra |
| 5,715,467 A | | 2/1998 | Jirgal |
| 5,719,800 A | | 2/1998 | Mittal et al. |
| 5,745,375 A | | 4/1998 | Reinhardt et al. |
| 5,787,294 A | | 7/1998 | Evoy |
| 5,805,909 A | * | 9/1998 | Diewald ...................... 713/322 |
| 5,815,693 A | | 9/1998 | McDermott et al. |
| 5,931,951 A | * | 8/1999 | Ando ......................... 713/324 |
| 5,982,814 A | * | 11/1999 | Yeh et al. ................... 375/222 |
| 6,016,548 A | * | 1/2000 | Nakamura et al. .......... 713/323 |
| 6,018,803 A | * | 1/2000 | Kardach ..................... 713/323 |
| 6,105,142 A | * | 8/2000 | Goff et al. ................... 713/324 |
| 6,118,306 A | | 9/2000 | Orton et al. |
| 6,161,188 A | * | 12/2000 | Gaskins et al. ............. 713/501 |
| 6,212,644 B1 | | 4/2001 | Shimoda et al. |
| 6,272,642 B2 | * | 8/2001 | Pole et al. .................. 713/300 |
| 2001/0003206 A1 | * | 6/2001 | Pole et al. .................. 713/320 |
| 2002/0062454 A1 | * | 5/2002 | Fung ........................... 713/300 |

FOREIGN PATENT DOCUMENTS

WO  PCT/US01/43639  4/2003

* cited by examiner

Primary Examiner—Marc S. Hoff
Assistant Examiner—Carol S. Tsai
(74) Attorney, Agent, or Firm—Blakely, Sokoloff, Taylor & Zafman LLP

(57) ABSTRACT

The utilization of a central processing unit during a sampling time interval is determined by measuring a time quantum within the sampling time interval during which a central processing unit clock signal is active within a processor core of the central processing unit. The total number of cycles of the central processing unit clock signal that are applied to the processor core and the period of the central processing unit clock signal are used to determine the time quantum. The utilization may then be expressed in terms of a ratio of the time quantum to the total time interval.

4 Claims, 8 Drawing Sheets

OPERATING SYSTEM-INDEPENDENT METHOD AND SYSTEM OF DETERMINING CPU UTILIZATION

FIELD OF THE INVENTION

The field of the invention relates generally to central processing units (CPUs). More particularly the field invention relates to determining CPU utilization. Still more particularly, the field of the invention relates to an operating system-independent method and system of determining utilization of a CPU within a data processing system.

BACKGROUND OF THE INVENTION

In most modern multi-programmed data processing or computer systems, various tasks or user applications contend for processing time to execute on a central processing unit (CPU) or similar processing device. Activity in even the most highly multi-tasking environment tends to be bursty, having periods of latency or inactivity followed by periods of intense processing activity. Accordingly, it is useful to analyze the utilization of CPUs and other similar data processing system devices for a variety of reasons. For example, high processor utilization during periods in which few or no user tasks are scheduled may be an indicia of a virus program or of some correctable fault in task scheduling resulting in thrashing or other inefficient system behavior. At present, several known mechanisms exist for determining CPU utilization within a data processing system.

As one example, in a conventional operating system (OS), CPU utilization is determined by accumulating CPU idle time across a sampling interval to determine the percentage of time the processor is inactive. To accomplish this, a list of tasks or threads is maintained by the OS which are ready-to-run, i.e., not waiting for some event to resume execution. When this ready-to-run list is empty, no tasks are being executed and the processor is idle. Accordingly, a CPU-independent timer is read and the processor is essentially deactivated. This is accomplished by putting the processor in a predefined processor performance state such as the C2 or C3 states defined by the well known Advanced Configuration and Power Interface Specification, Revision 2.0, Jul. 27, 2000 (ACPI). In the C2 state clock signals are removed from the functional units of the processor while its memory subsystem remains active and "snoopable" by other devices. In a C3 state, the clock signal is also removed from this memory portion of the data processing system and a so-called "deep sleep" state is entered. When a new task is added to the ready-to-run list, the processor is placed in an active state (such as the C0 ACPI state) and the timer is read again. The difference between the first and second timer reads (multiplied by the timer's period) then represents the CPU's idle time. The accumulation of this time across a sampling interval is then used to determine the CPU utilization. Unfortunately, neither this measure of CPU utilization nor the state of the ready-to-run task list is available outside of the OS through a supported application programming interface (API).

BRIEF DESCRIPTION OF THE DRAWINGS

The present invention is illustrated by way of example and not limitation in the figures of the accompanying drawings, in which

FIG. 1b illustrates a prior art architecture of the data processing system depicted in FIG. 1a;

DETAILED DESCRIPTION OF THE INVENTION

An operating system-independent method and system of determining utilization of a CPU within a data processing system is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

Figure 1A:
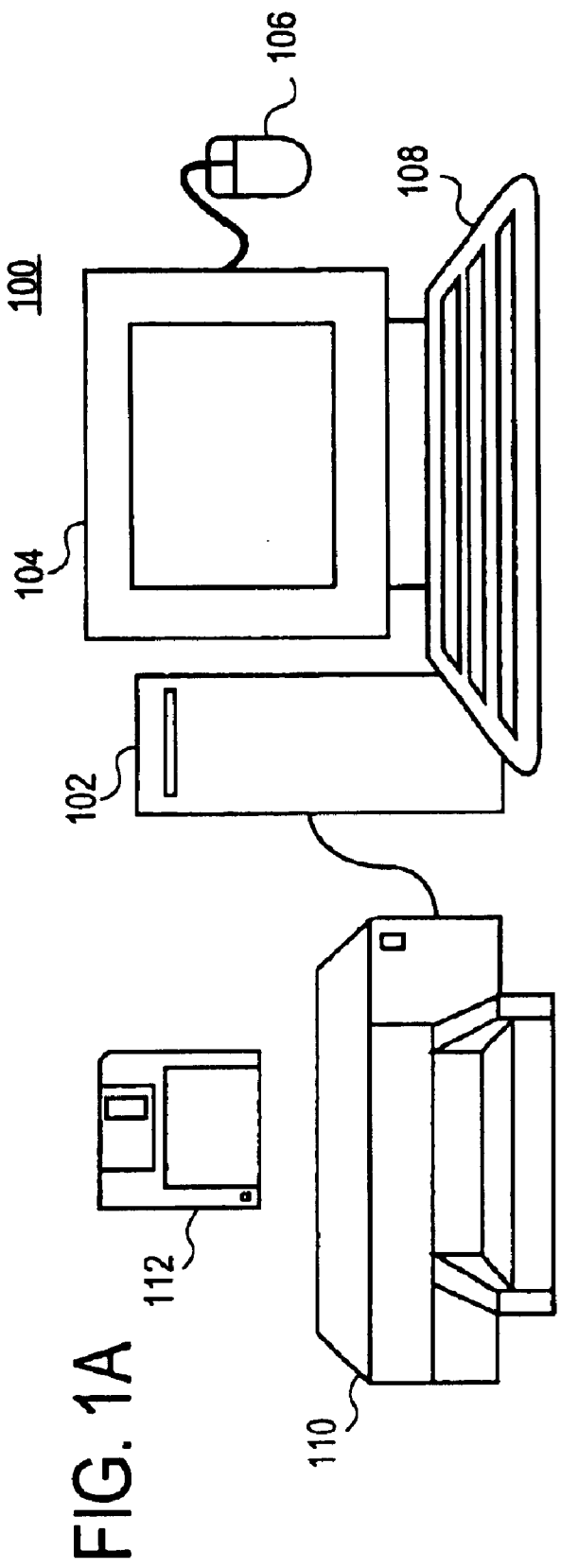
FIG. 1a illustrates a conventional data processing system useable with the present invention.

Referring now to FIG. 1a, a conventional data processing system 100 useable with the present invention is illustrated. Data processing or computer system 100 is comprised of a system unit 102, output devices such as display 104 and printer 110, and input devices such as keyboard 108, and mouse 106. Data processing system 100 receives data for processing by the manipulation of input devices 108 and 106 or directly from fixed or removable media storage devices such as disk 112 and network connection interfaces (not shown). Data processing system 100 then processes data and presents resulting output data via output devices such as display 104, printer 110, fixed or removable media storage devices like disk 112 or network connection interfaces.

Figure 1B:
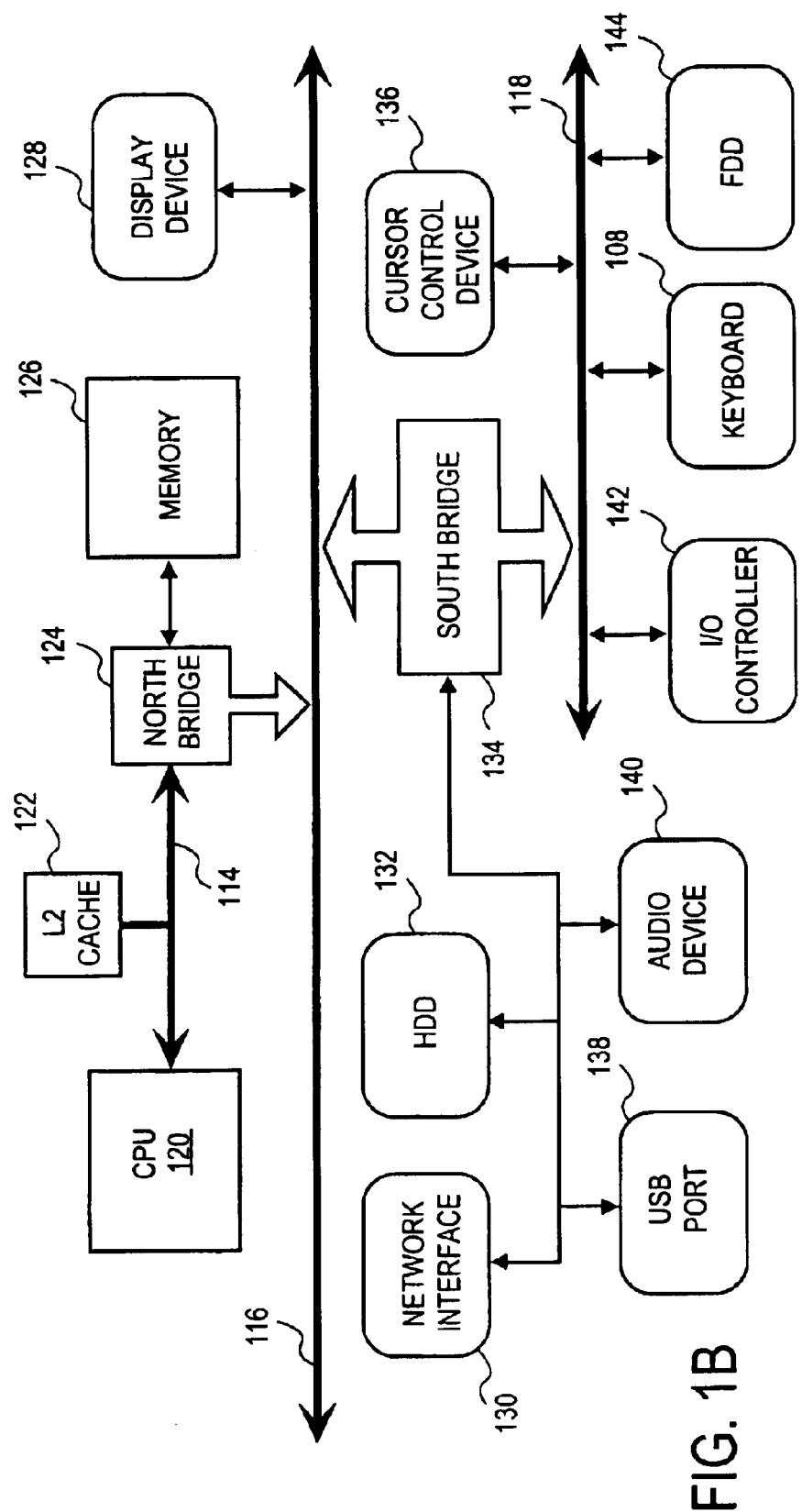

Referring now to FIG. 1b, there is depicted a high-level block diagram of the components of a data processing system 100 such as that illustrated by FIG. 1a. In a conventional computer system, system unit 102 includes a processing device such as central processing unit (CPU) 120 connected to a level two (L2) cache 122 over a processor system bus (PSB) 114. Processor system bus 114 is in turn coupled to an expansion bus such as local bus 116 and a memory 126 via a north bridge circuit 124. Local bus 116 may include a peripheral component interconnect (PCI), Video Electronics Standards Association (VESA) bus or the like, tightly coupled to the processor 120 and the processor system bus 114 to permit high-speed access to select devices such as display device 128.

Memory 126 may include read-only (ROM) and/or random access (RAM) memory devices such as a synchronous dynamic random access memory (SDRAM) module capable of storing data as well as instructions to be executed by CPU 120. Access to data and instructions stored within memory 126 is provided via a memory controller (not shown) within north bridge circuit 124. L2 cache 122 is similarly used, typically in a hierarchical manner, to store data and instructions for direct access by CPU 120. Display device 128 may include a cathode ray tube (CRT) display such as display 104, liquid crystal display (LCD), or a similar device for displaying various kinds of data to a computer user. For example, image, graphical, or textual information may be presented to the user on display device 128. System unit 102 of data processing system 100 also features an expansion or "compatibility" bus 118 such as the Industry Standard Architecture (ISA) bus, and a south bridge circuit 134 coupling it to local bus 116 to facilitate the attachment of other, relatively slower devices to the system 100. South bridge circuit 134 includes a universal serial bus (USB) port 138 as well as other direct connections for devices such as a network interface card 130, a data storage device, such as a magnetic hard disk drive 132, and an audio device 140 such as a speaker or sound card.

Other devices not directly coupled to south bridge 134 may be connected to the system 100 via the expansion bus 118 as illustrated. A floppy disk drive (FDD) 144 providing additional data storage capacity on removable media storage devices such as disk 112, and input devices such as a keyboard 108 and a cursor control device 136 are each coupled to expansion bus 118 in this manner to communicate data, instructions, and/or command selections to central processing unit 120. Cursor control device 136 may comprise a conventional mouse such as mouse 106 of FIG. 1a, a trackball, or any other device capable of conveying desired cursor manipulation. Similarly, expansion bus 118 includes an input/output (I/O) controller having standard serial and parallel port functionality for connecting other I/O devices such as printer 110 to the system.

The system of the present invention includes software, information processing hardware, and various processing steps, which will be described below. The features and process steps of the present invention may be embodied in machine or computer executable instructions embodied within media such as disk 112. The instructions can be used to cause a general purpose or special purpose processor such as CPU 120, which is programmed with the instructions to perform the described methods of the present invention. Alternatively, the features or steps of the present invention may be performed by specific hardware components that contain hard-wired logic for performing the steps, or by any combination of programmed computer components and custom hardware components.

Figure 2:
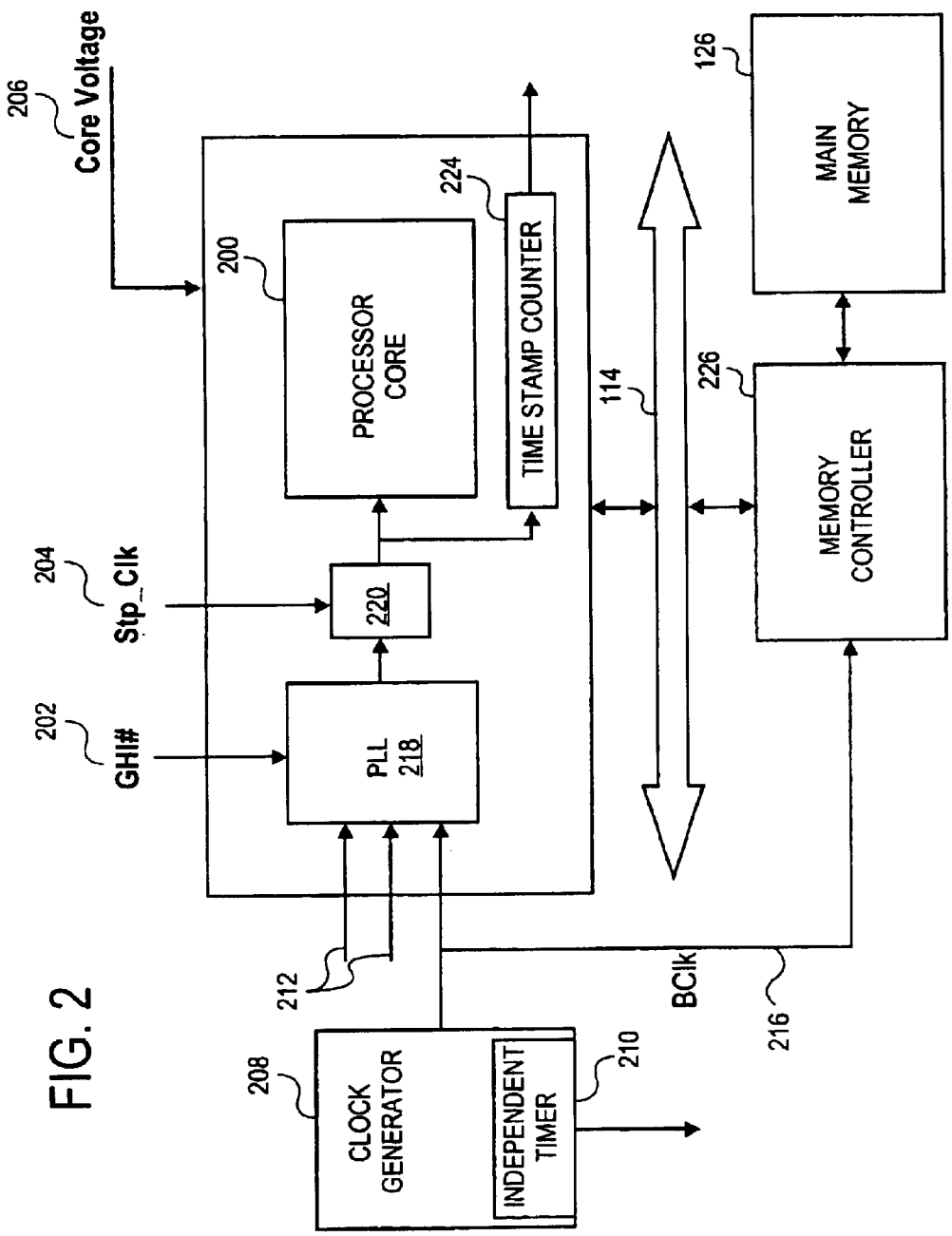
FIG. 2 illustrates a portion of the architecture depicted in FIG. 1b in greater detail.

Referring now to FIG. 2, a portion of the architecture depicted in FIG. 1b is illustrated in greater detail. Processor 120 is shown in communication with memory 126 over the processor system bus 114 utilizing a memory controller 226 of north bridge circuit 124. A common system clock, (BClk) 216 is generated by a clock generator 208 and applied to a clock control phase lock loop (PLL) 218 of CPU 120 and to memory controller 226. A core voltage 206 is similarly applied to CPU 120 in the illustrated embodiment, providing necessary operating power. While the BClk signal 216 is applied, accesses to and from memory 126 occur at its frequency of approximately 100 megahertz (MHz). The central processing unit 120 however, is capable of performing tasks at much greater speeds than this and accordingly, a bus ratio or multiplier 212 is selected using a clock control signal, GHI# 202 and a higher frequency central processing unit clock signal is generated utilizing PLL 218. So for example, if the system or front side clock 216 has a frequency of 100 MHz, and a ratio 212 of 5 to 1 is selected using the GHI# signal 202, then the generated CPU clock will have a frequency of approximately 500 MHz. Alternatively, a higher multiplier or ratio 212 of say 7 to 1 could be selected, yielding a CPU clock frequency of approximately 700 MHz.

The generated central processing unit clock signal is then applied to clock throttling logic 220 before being passed to processor core 200. Throttling is a technique by which the CPU clock is deasserted or "gated off" from the processor core to prevent functional units within the core from operating. Throttling logic 220 therefore acts as a switch, actuated by a stop clock (Stp_Clk) control signal 204, between the PLL 218 and the processor core 200. A time stamp counter 224 is also included within the CPU 120 and incremented for each cycle (sometimes called ticks or pulses) of the CPU clock which is "gated through" or applied to the processor core as shown. Because time stamp counter 224 tracks the number of clock ticks or cycles applied to the functional units of the processor core 200 such as instruction decoders, floating point and integer execution units, etc. it provides an extremely accurate representation of the actual work performed by CPU 120. One additional chipset architecture component illustrated in FIG. 2 is independent timer 210. System independent timer 210 runs independently of CPU 120 and its associated system clock 216, unaffected by Stp_Clk signal 204 throttling or BClk signal 216 frequency modifications. Using the number of ticks of independent timer 210 elapsed between reads and its fixed frequency, an accurate measure of the passage of time may be obtained. In one embodiment, a Windows™ high performance counter, exported via the Win32 Application Programming Interface (API) as the QueryPerformanceCounter( ) function can be used as independent timer 210. In an alternative, Advanced Configuration and Power Interface (ACPI) compliant embodiment, a power management timer may be utilized. Although in the illustrated embodiment independent timer 210 is depicted as being integrated with clock generator circuit 208, in alternative embodiments the timer 210 may be generated in a separate device or integrated circuit.

Figure 3:
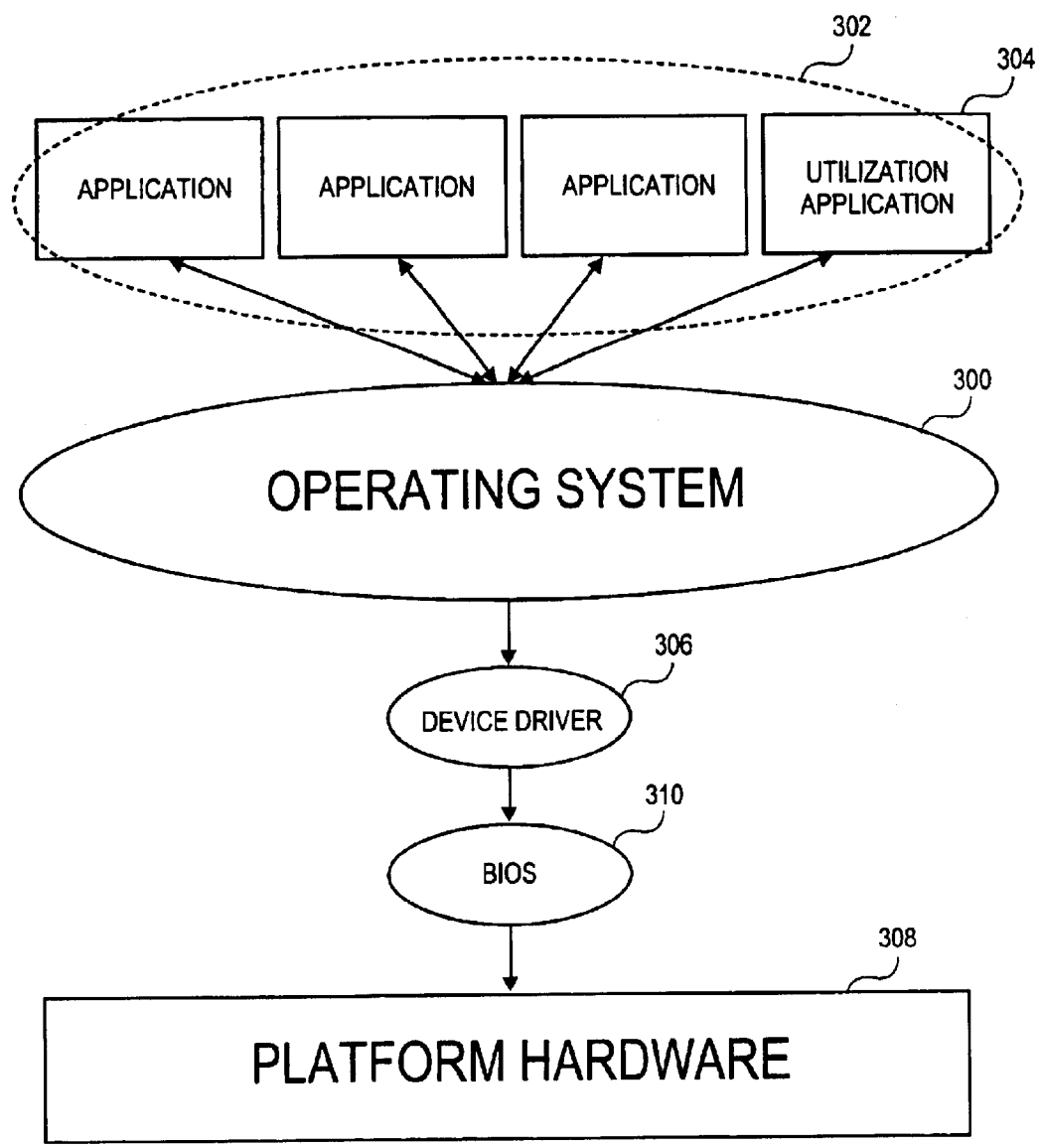
FIG. 3 illustrates an architectural system diagram depicting the operation of a data processing system according to the present invention.

Referring now to FIG. 3, an architectural system diagram depicting the operation of a data processing system according to the present invention is illustrated. In the illustrated embodiment, a plurality of application programs 302 such as CPU utilization application 304 interact with various platform hardware devices 308 including a CPU 120 via an operating system 300 such as the Windows™ operating system from Microsoft Corporation, one or more device drivers 306, and basic input/output system (BIOS) code 310. The illustrated system is interrupt-driven both with respect to the multitasking of the various applications 302 and communication between applications 302 and platform hardware 308. Accordingly, in one embodiment of the present invention, an application 302 request for a hardware resource from within platform hardware 308 can cause an interrupt, such as a System Control Interrupt (SCI) or a System Management Interrupt (SMI) to be generated and an interrupt handler routine to be responsively executed. Interaction between operating system 300 and platform hardware 308 is then facilitated by a device driver 306 and BIOS 310. In the illustrated embodiment, BIOS 310 contains information such as physical device addresses of the various devices 308 attached to the data processing system 100 and is useful with respect to the actual transmission of data. By contrast, device driver 306 is typically specific to a particular hardware device and is usually concerned with the translation of data between various device formats.

Figure 4:
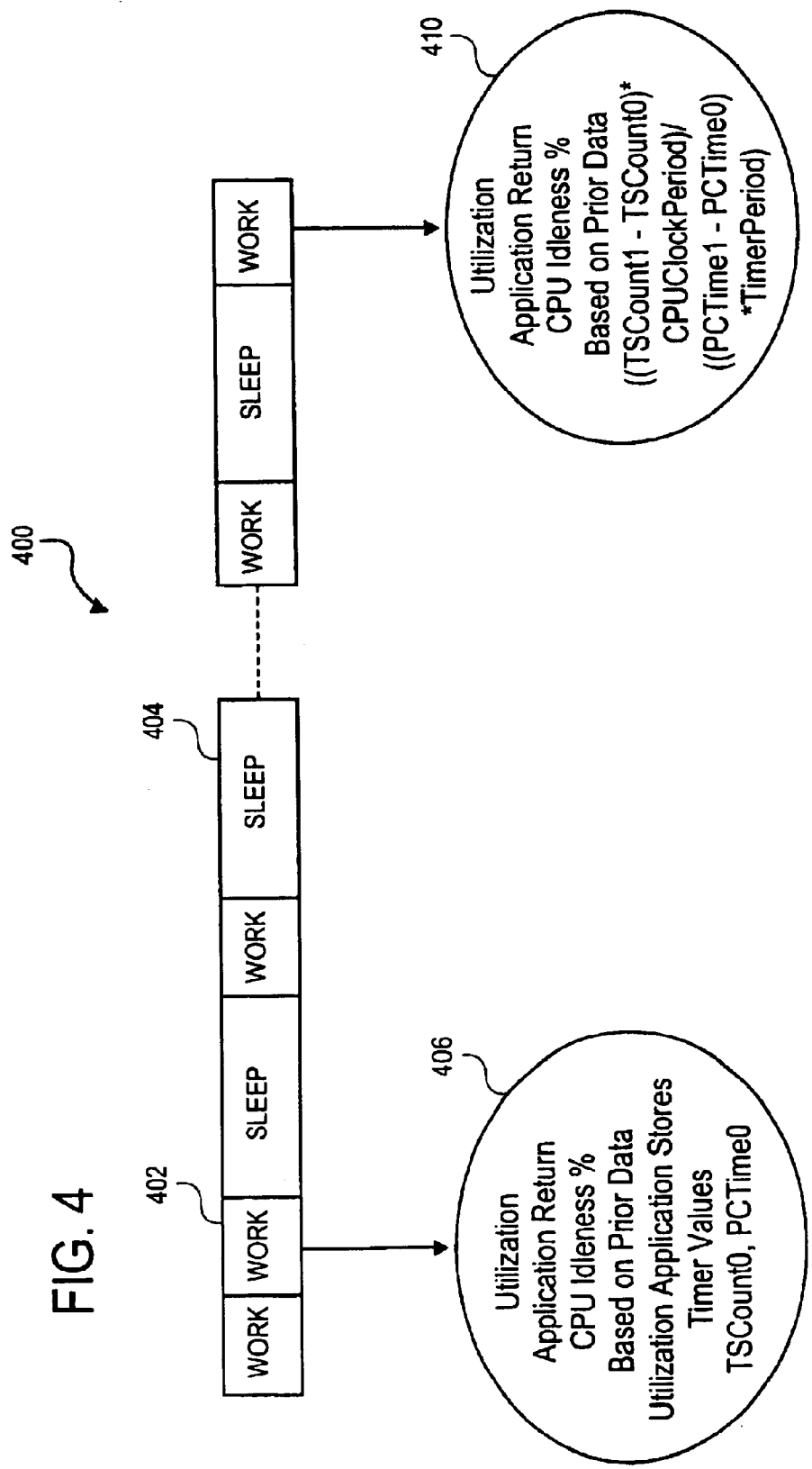
FIG. 4 illustrates a first embodiment of an application program utilization sequence of the present invention.

Referring now to FIG. 4, a first embodiment of an application program utilization sequence of the present invention is illustrated. Various periods of work and sleep are depicted over a time interval 400 which correspond to the application or removal of a central processing unit clock signal to the processor core 200 of a CPU 120.

The illustrated work periods 402 may therefore represent the C0 processor performance state of an ACPI-compliant data processing system. Similarly, the illustrated "sleep" state 404 would correspond to the C2 and greater states in that such a processor clock signal is removed from the processor core 200 for each of these states. In the illustrated embodiment of FIG. 4, CPU utilization application comprises a periodically executing applet or application. Each time the applet is executed, a CPU utilization factor is calculated based upon data from the prior execution (or from default values for the first execution). As illustrated, during a first execution 406 the executing applet retrieves a value from the performance counter previously described herein. The performance counter will be read again during a second execution 408 of the applet and the elapsed time between reads will be computed as the difference between the counter values at the second 408 and first 406 reads multiplied by a predefined timer clock period. In addition to the performance counter, during each execution 406, 408 of the utilization applet a time stamp counter 224 is read. In the illustrated embodiment, the total number of ticks or cycles of the CPU clock signal that have been applied to the CPU core 200 between the first execution 406 and the second execution 408 are calculated by subtracting the first value read (TSCount0) from the final value obtained from the time stamp counter 224, (TSCount1). Since the frequency of the clock signal applied to CPU 120 can be varied as previously described, the applied tick count is then converted to a unit of time by multiplying the tick count value (TSCount1−TSCount0) by the current CPU clock signal period, which is also the clock period for the CPU time stamp counter 224. This period is obtained in one embodiment of the present invention from the SMI interrupt handler which is responsible for transitioning a processor 120 from one performance state to another, and accordingly for transitioning CPU 120 clock signals from one value to another utilizing the GHI# and StpClk control signals described herein. The CPU 120 utilization may then be expressed as a ratio or percentage of time during the sampling interval (between reads of the system independent counter) during which the CPU 120 clock signal is applied to the processor core 200, taking into consideration variations in the applied clock signal frequency as shown.

Figure 5:
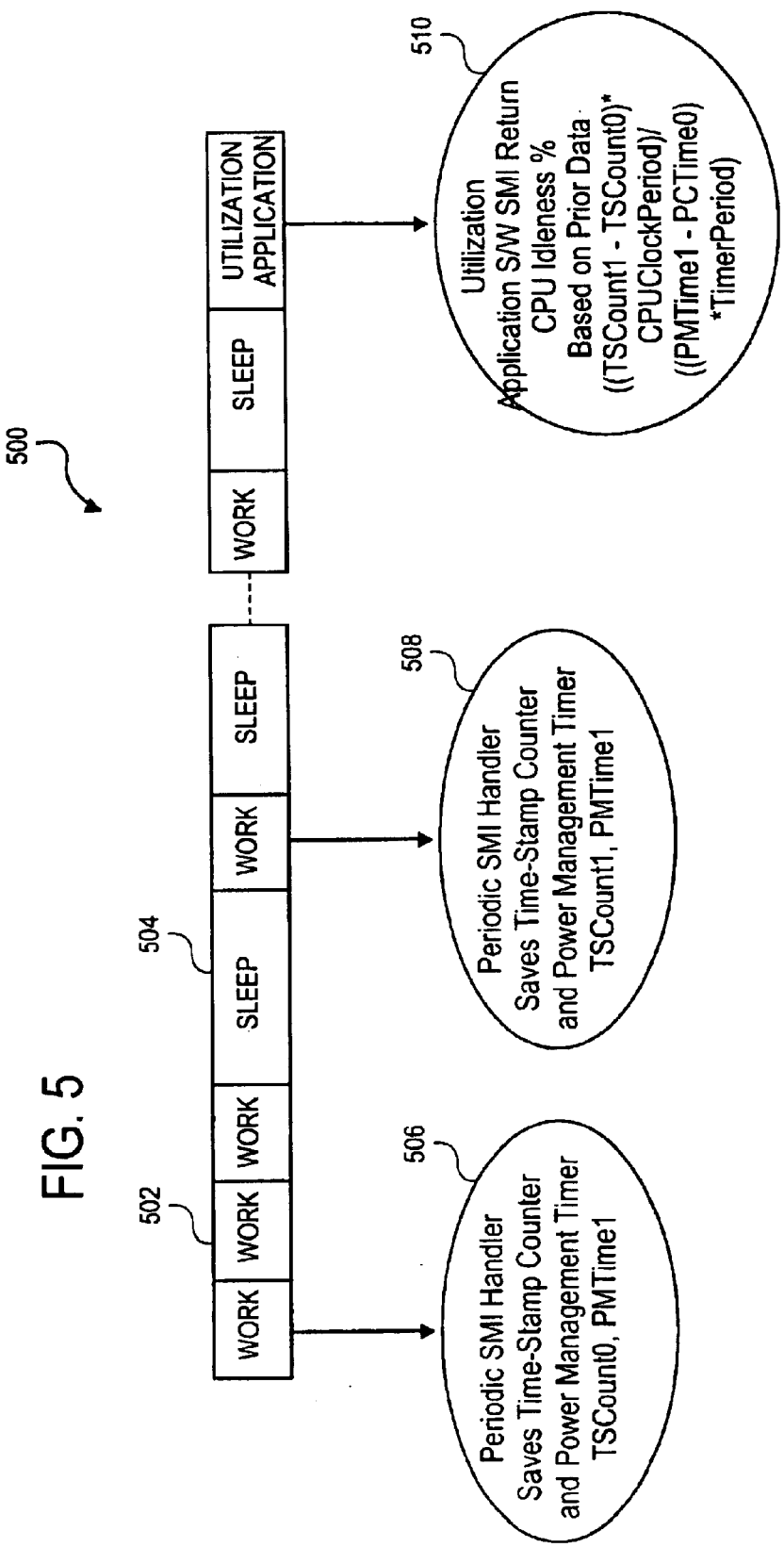
FIG. 5 illustrates a second embodiment of an application program utilization sequence of the present invention.

Referring now to FIG. 5, a second embodiment of an application program utilization sequence of the present invention is illustrated. Various periods of work and sleep are similarly depicted over a time interval 500 which correspond to the application or removal of a CPU clock signal to the processor core 200 of a CPU 120 and consequently to the C0 and C2 and greater ACPI processor performance states respectively. By contrast to the utilization sequence shown in FIG. 4 however, in the illustrated embodiment of FIG. 5, a periodically executing interrupt handler such as an SMI handler 506, 508 is utilized to read the values necessary for calculating CPU utilization without actually performing the computation. Instead, the values are read, stored, and subsequently provided to a CPU utilization applet 510 which determines the actual percentage of active CPU time. Moreover, a power management timer rather than the performance counter is utilized in this embodiment to determine the passage of time. During a first execution of SMI handler 506 a value is read from both the time stamp counter 224 (TSCount0) and the power management timer (PMTimer0) of the data processing system. During a second execution 508 of the periodic handler values are read again from both of these timers and in both cases the obtained values are stored. Subsequently, a CPU utilization applet is executed 510 and the idleness of CPU 120 is calculated as a ratio or percentage of active CPU time over the interval between SMI handler executions 506, 508 using the values stored by the SMI handler and the periods of both timers.

Figure 6:
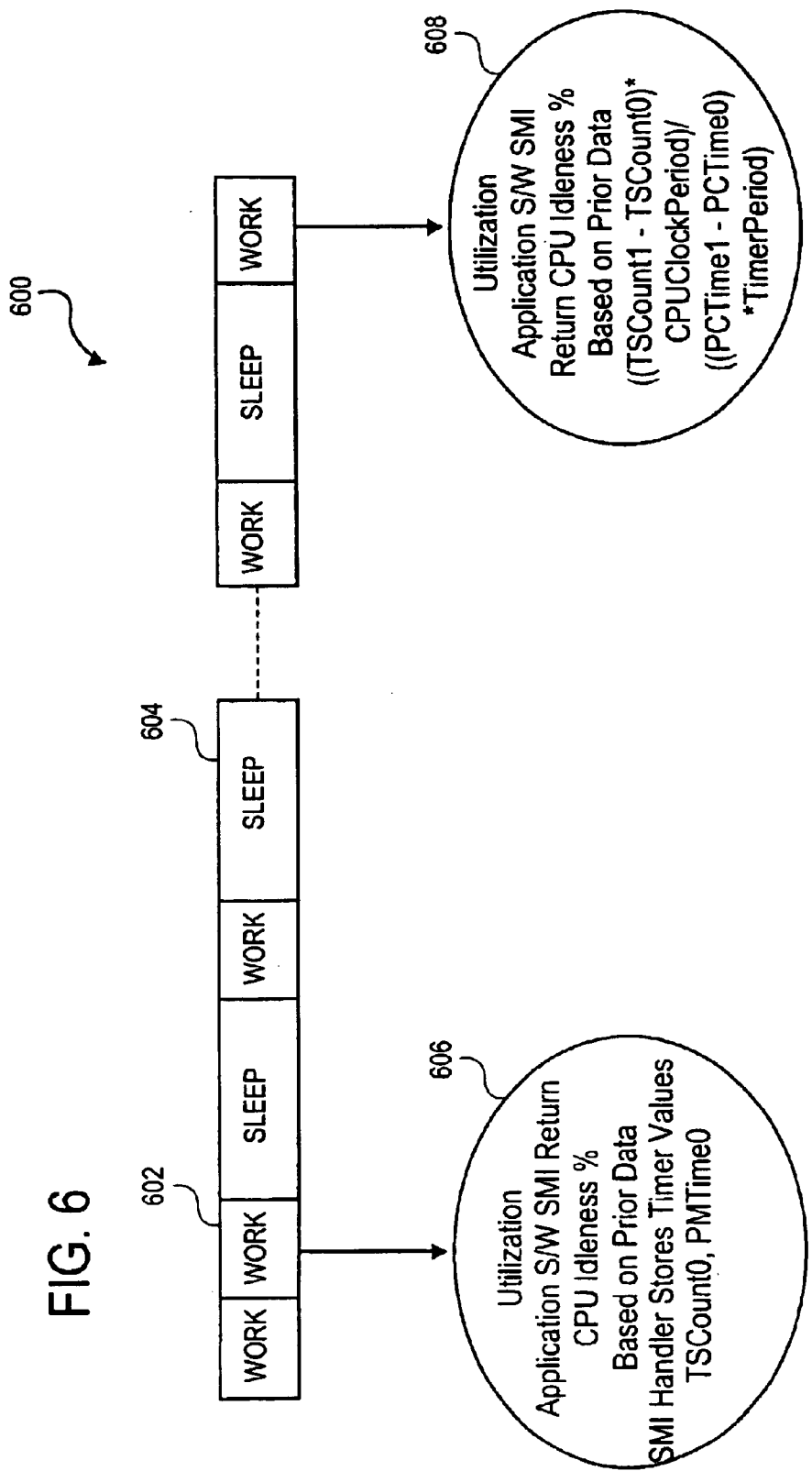
FIG. 6 illustrates a third embodiment of an application program utilization sequence of the present invention.

Referring now to FIG. 6, a third embodiment of an application program utilization sequence of the present invention is illustrated. Various periods of work and sleep are similarly depicted over a sampling time interval 600 which correspond to the application or removal of a CPU clock signal to the processor core 200 of a CPU 120 and consequently to the C0 and C2 and greater ACPI processor performance states, respectively. In the illustrated embodiment a system management interrupt is generated by a periodically executing utilization applet 606, 608 to determine the value of each required timer or counter. Accordingly, during a first execution 606 of a utilization applet an SMI is generated causing the associated SMI handler routine to read values from time stamp counter 224 and from a system independent timer 210 such as the power management timer as shown. After the expiration of the sampling time interval, the applet 608 and SMI handler are executed again to obtain the values necessary for evaluating the utilization of the CPU 120.

Figure 7:
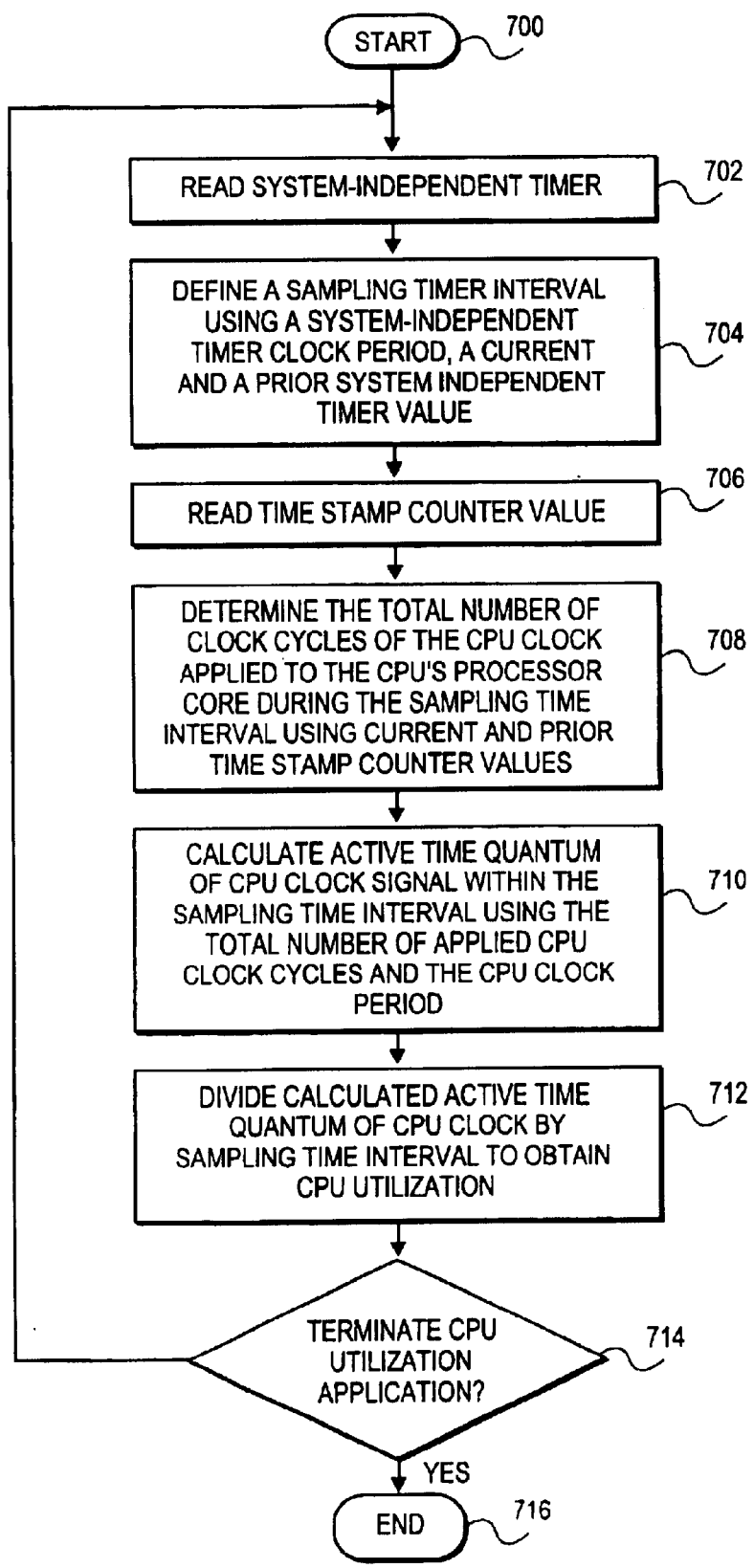
FIG. 7 illustrates a high-level logic flowchart of one embodiment of the method of the present invention.

Referring now to FIG. 7, a high-level logic flowchart of one embodiment of the method of the present invention is illustrated. FIG. 7 depicts a technique by which the utilization of a CPU may be determined independently of a data processing system's operating system. The process illustrated by FIG. 7 begins at block 700. Thereafter, a system-independent tinier such as the power management timer or Windows™ performance, counter discussed herein is read. (block 702). Next, a sampling time interval is defined using the independent timer's clock period, as well as currently and previously read system-independent timer values (block 704). A value is ten read from a time stamp counter (block 706) which is incremented for each cycle or "clock" of a CPU clock signal which is applied to the processor core 200 of central processing unit 120. Using a previously read time stamp counter value and the currently read value, the total number of CPU clock signal ticks or cycles applied to the CPU's processor core 200 during the sampling time interval may be obtained (block 708). Thereafter, the total amount or "quantum" of time within the sampling time interval during which the CPU clock signal was active within the CPU's processor core 200 can be derived using the accumulated number of CPU clock cycles and the CPU clock signal's period (block 710). CPU utilization may then be expressed as a ratio of this active CPU clock signal time to the sampling time interval (block 712). Next, it is determined whether the CPU utilization application and. analysis is to be terminated (block 714). If not, the process is repeated beginning at an entry point depicted by block 702. If so, the process is terminated (block 716).

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A central processing unit comprising:

a processor core; and a time stamp counter to measure a total number of cycles of a central processing unit clock signal that are applied to said processor core during a sampling time interval, said processor core determines a utilization of said central processing unit utilizing said total number of cycles of said central processing unit clock signal, said processor core calculates a time quantum within said sampling time interval during which said central processing unit clock signal is active within said processor core utilizing said total number of cycles of said central processing unit clock signal and a period of said central processing unit clock signal.

2. The central processing unit as set forth in claim 1, wherein said processor core to determine a utilization of said central processing unit utilizing said total number of cycles of said central processing unit clock signal comprises:

a processor core to calculate a ratio of said time quantum to said sampling time interval.

3. A data processing system comprising:

an independent timer to define a sampling time interval;

a clock generator circuit to generate a system clock signal;

a phase lock loop to receive said system clock signal and to generate a central processing unit clock signal utilizing said system clock signal; and a central processing unit comprising:

a processor core; and a time stamp counter to measure a total number of cycles of said central processing unit clock signal that are applied to said processor core during said sampling time interval, wherein said processor core determines a utilization of said central processing unit utilizing said total number of cycles of said central processing unit clock signal, said processor core calculates a time quantum within said sampling time interval during which said central processing unit clock signal is active within said processor core utilizing said total number of cycles of said central processing unit clock signal and a period of said central processing unit clock signal.

4. The data processing system as set forth in claim 3, wherein said processor core to determine a utilization of said central processing unit utilizing said total number of cycles of said central processing unit clock signal comprises:

a processor core to calculate a ratio of said time quantum to said sampling time interval.

* * * * *

UNITED STATES PATENT AND TRADEMARK OFFICE
CERTIFICATE OF CORRECTION

PATENT NO.    : 6,711,526 B2
DATED         : March 23, 2004
INVENTOR(S)   : Cooper It is certified that error appears in the above-identified patent and that said Letters Patent is hereby corrected as shown below:

Column 1,
Line 16, delete "modem" and insert -- modern --.

Column 6,
Line 30, delete "tinier" and insert -- timer --.
Line 31, delete "," after the word "performance".
Line 35, delete "ten" and insert -- then --.
Line 50, delete "." after the word "and".

Signed and Sealed this

Tenth Day of August, 2004

JON W. DUDAS
*Acting Director of the United States Patent and Trademark Office*